United States Patent [19]

Ghosh et al.

[11] 3,917,916

[45] Nov. 4, 1975

[54] METHOD AND MEANS FOR INTERROGATION OF DIGITAL REPEATERED LINES

[75] Inventors: Suhas Ghosh, Naperville; Robert Ruffatti, Joliet, both of Ill.

[73] Assignee: Wescom, Inc., Downers Grove, Ill.

[22] Filed: Aug. 29, 1974

[21] Appl. No.: 501,786

[52] U.S. Cl. ........................................ 179/175.31 R

[51] Int. Cl.$^2$ ........................................ H04B 3/46

[58] Field of Search ............ 179/175.31 R, 175.3 R, 179/2 A

[56] References Cited

UNITED STATES PATENTS

| | | | |
|---|---|---|---|
| 3,651,284 | 3/1972 | Maione | 179/175.31 R |
| 3,692,964 | 9/1972 | Camiciottoli et al. | 179/175.31 R |
| 3,760,127 | 9/1973 | Camiciottoli et al. | 179/175.31 R |
| 3,770,913 | 11/1973 | Camiciottoli et al. | 179/175.31 R |

*Primary Examiner*—Kathleen H. Claffy
*Assistant Examiner*—Douglas W. Olsm
*Attorney, Agent, or Firm*—Wolfe, Hubbard, Leydig, Voit & Osann, Ltd.

[57] ABSTRACT

A circuit arrangement for interrogation of digital repeatered transmission lines wherein testing stations are provided in the form of interrogation circuits each having a unique digital address serviced by a fault line adapted to transmit signals containing such digital addresses. In an exemplary embodiment, a testing station is provided at each repeater station so that the regenerators in the repeaters may be individually tested from a central station. For responding to the assigned address each testing station includes a coincidence detector. Upon detection of a coincidence, the test response of the regenerator is coupled to the fault line for return to the central office. Means are provided at each testing station to modulate the returned signal with the assigned digital address, thereby verifying the source of the test response. The verification feature provides an additional operating mode incorporating self-interrogation for report-back of line failure locations.

22 Claims, 17 Drawing Figures

METHOD AND MEANS FOR INTERROGATION OF DIGITAL REPEATERED LINES

This invention relates to bipolar digital communication systems, and particularly to means for monitoring and testing the transmission lines and repeaters used therein to assure the necessary quality of transmission.

Communication systems of the type considered herein are digital in nature utilizing bipolar transmission techniques in which the transmitted digital signal is comprised of a series of high frequency digital pulses separated by a varying number of spaces. The nature of the coding techniques requires that, in a properly functioning system, successive pulses must be of opposite polarity. To preserve accuracy both the signal amplitude and timing must be accurately maintained, and to that end, repeaters in the form of signal regenerators are coupled in the line at spaced locations to retime and regenerate the serial signal. It is apparent that the proper functioning of the regenerators is a prerequisite to a reliable communications system.

In recognition of the need to efficiently test transmission lines of the foregoing type to maintain satisfactory operation thereof, various testing schemes have been devised. Generally, these testing schemes take advantage of the bipolar nature of the signal. For example, a simple test set has been devised which may be bridged across a transmission line for monitoring the signals thereon. Such monitor remains passive in the presence of the normal bipolar signal, but responds to the occurrence of bipolar violations (successive pulses of identical polarity). The monitor may be arranged to count the number of bipolar violations, or to produce a visual signal indicating the occurrence of bipolar violations. While such a monitoring device is useful in identifying a faulty span line, it is not particularly suited to localizing the fault within the line. Of course, a repairman might localize a fault utilizing such a monitor by bridging it across the output of each regenerator. However, as regenerators are spaced at intervals of a mile or more, and as they are generally inaccessibly located, such an approach would be time consuming and inefficient.

Equipment and procedures have been developed for interrogating a transmission line from a central location to determine its operational condition, as well as to localize any faults therein. A widely adopted technique uses a test signal which is coupled to the transmission line, thereby allowing each regenerator in the line to respond, in conjunction with a fault line for returning the response of a selected regenerator to the central station for evaluation. The test signal is generally bipolar in nature, but has bipolar violations injected therein in a pattern which injects an audio frequency component to the test signal. A regenerator which regenerates such a signal produces an output signal having a relatively strong audio frequency component corresponding to that of the test signal. A faulty regenerator will fail to respond properly to such a signal, and will return either no audio signal or a very weak audio signal. A marginal regenerator will initially return an audio signal, but will fail as the amplitude of the audio frequency component within the test signal is increased. It should be noted that as all three of the aforementioned occurrences contain intelligence, they may be collectively termed a test signal response.

In order to individually test each regenerator in a transmission line using a single fault line, the interrogation systems have evolved to include a test signal generator capable of producing twelve test signals, each having a unique audio frequency component. While each regenerator responds to each of the above noted test signals, selection is accomplished by coupling the fault output of each regenerator to the fault line through an associated high Q bandpass filter. A series of twelve filters is provided, with one of the twelve located at each repeater station. An even further increase in the capacity of a single fault line has been accomplished by "looping back" at the far end of the line the transmitted test signal to the "receive" transmission line, and individually coupling the "transmit" and "receive" regenerator responses to the fault line. Such coupling may be accomplished, for example, by means of polarity responsive switched amplifiers controlled by the polarity imposed on the fault line.

As the digital carrier transmission systems considered herein have increased in length, schemes have been devised to increase the number of regenerators which may be tested from a central location using a single fault line. While multiple fault lines might be used, this would be contrary to the rationale of the carrier transmission system, in that the transmission system uses sophisticated multiplexing and encoding equipment for the very purpose of achieving maximum utilization of each pair of wires. An improved system utilizing the traditional twelve frequencies has been introduced, and is the subject of the Ghosh et al. U.S. patent application No. 413,412 filed Nov. 6, 1973. That system introduced a unique coding technique for the test signal which effectively doubled the number of repeaters able to be tested using the traditional twelve frequencies. However, as digital carrier communications systems are losing their "short haul" character, with anticipated expansion to long lines of 150 miles or more, even that system may not be adequate.

With the foregoing in mind, it is a general aim of the present invention to provide an interrogation and monitoring system for digital transmission lines having a different operating mode than those known heretofore, in which the number of regenerators which may be tested from a central station is greatly increased. More specifically, it is an object of the invention to provide an interrogation system utilizing digital addressing techniques, in which the number of regenerators which may be remotely tested is as great as the number of unique digital words provided for within the system.

It is a more particular object to provide a new and improved procedure for utilizing a fault line for interrogating digital transmission systems, in which the fault line is adapted to both select an individual regenerator for test and to return the test response of the selected regenerator. In accomplishing the foregoing, it is an aim to use digital addressing techniques, thereby eliminating the need for bandpass filters in the selection scheme.

A detailed object of the invention is to provide an interrogation system for digital transmission lines operable from a central testing station and having a plurality of remote testing stations, each of the remote stations being assigned a unique digital address, and each of the remote stations adapted to respond to receipt of its associated digital address from the central station for returning its test response to the central station. It is a further object to provide each remote testing station with the capability to modulate its returned response with its assigned digital address for verification purposes. It is still a further object to provide a system of the foregoing type wherein one or more of the remote testing stations include the capability of internally generating a response signal indicating an equipment failure, coupled with the capability of modulating and returning the internally generated response signal to the central office to indicate the location of the equipment failure.

Finally, it is an object of the invention to provide a fault line for use with digital transmission systems having sufficient operational flexibility for allowing its use in fault location initiated from the central station, or in fault location reporting initiated from selected remote stations.

Other objects and advantages will become apparent from the following detailed description when taken in conjunction with the accompanying drawings in which:

FIG. 7b is a timing diagram of various wave forms in the circuit of FIG. 7a;

Figure 7B:
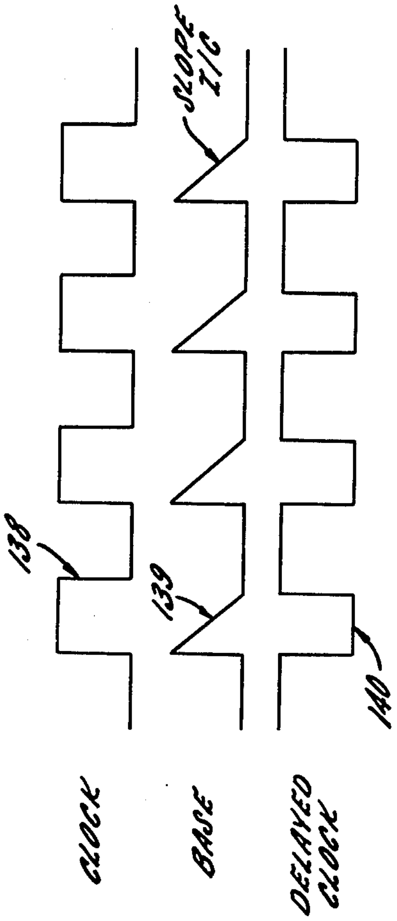
Figure 7A:
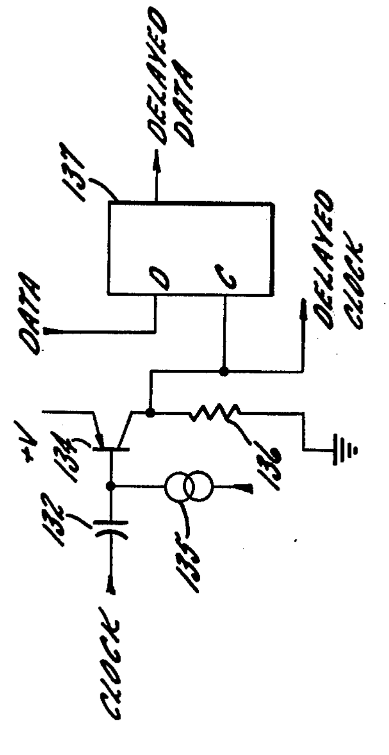
FIG. 7a is a diagram illustrating the principle of operation of the automatic phase adjuster used to synchronize the incoming modulated response signal.
Figure 8A:
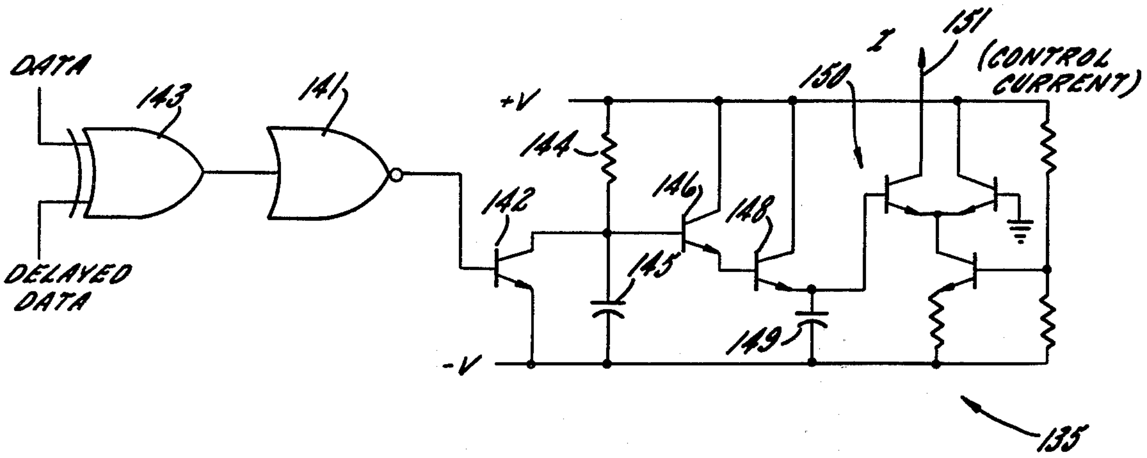

FIG. 8*a* is a schematic diagram illustrating a means for implementing the phase adjuster of FIG. 7*a;*

Figure 8B:
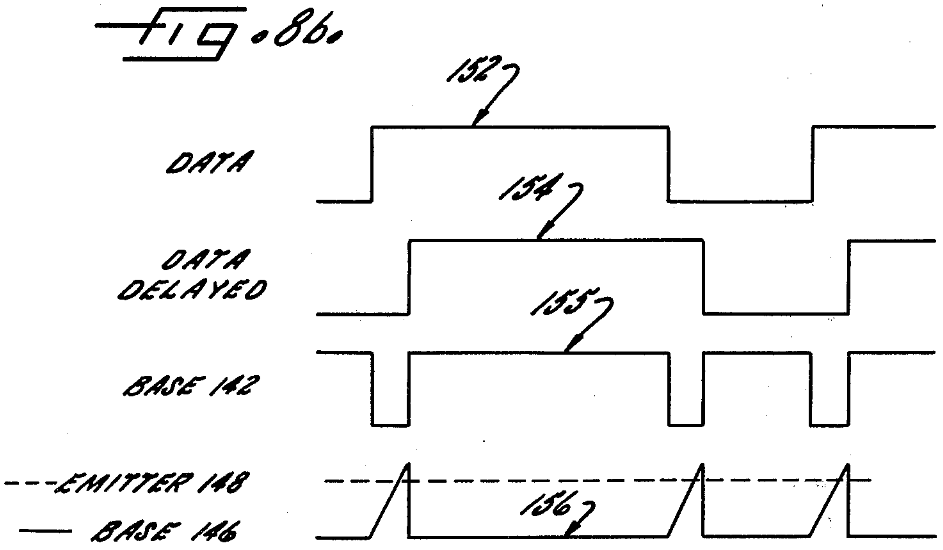

FIG. 8*b* is a timing diagram illustrating the operation of the circuit of FIG. 8*a;*

Figure 1:
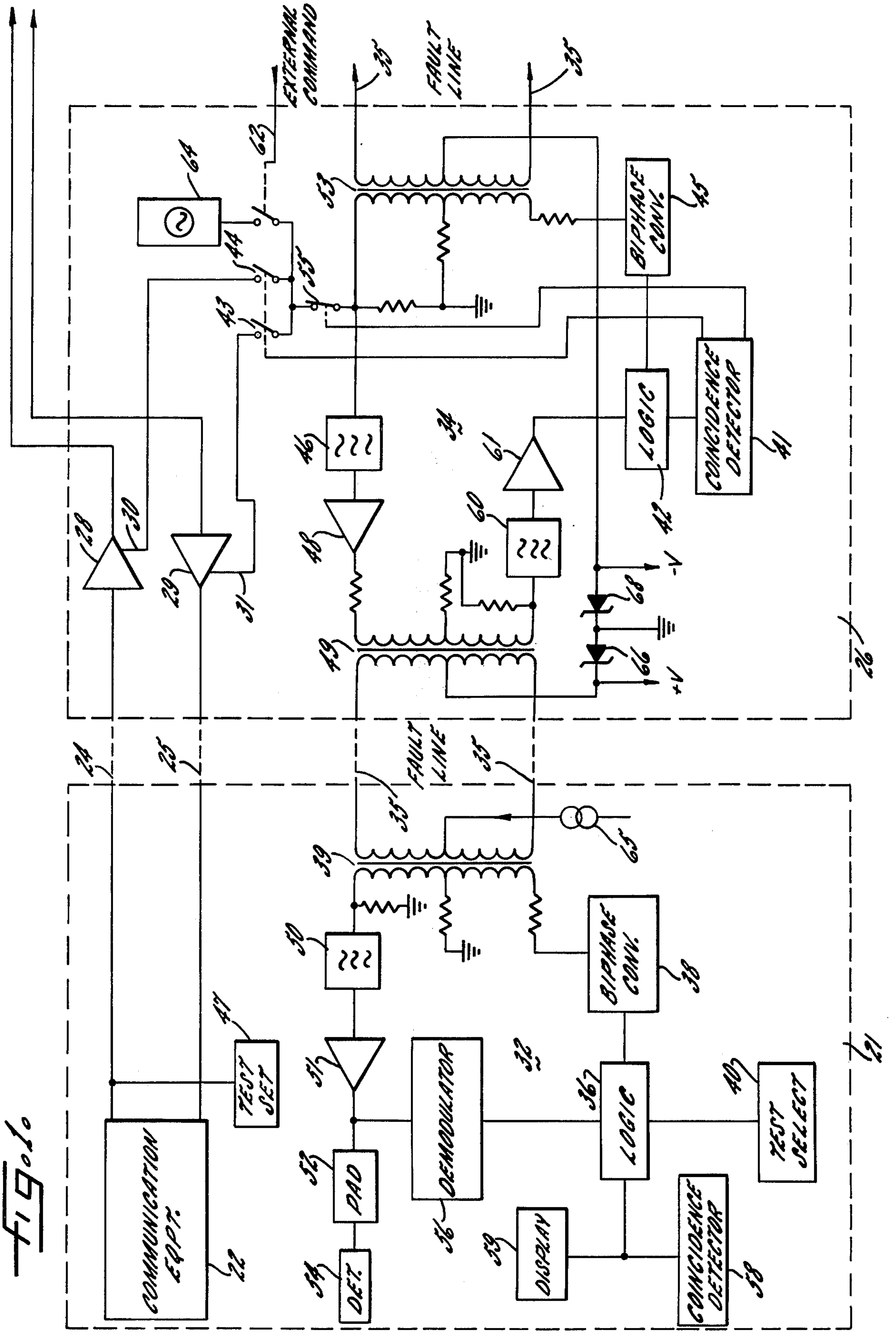
FIG. 1 is a schematic illustration of a section of a digital transmission line incorporating a remote interrogation system exemplifying the present invention.
Figures 4, 5, 10B, 10D:
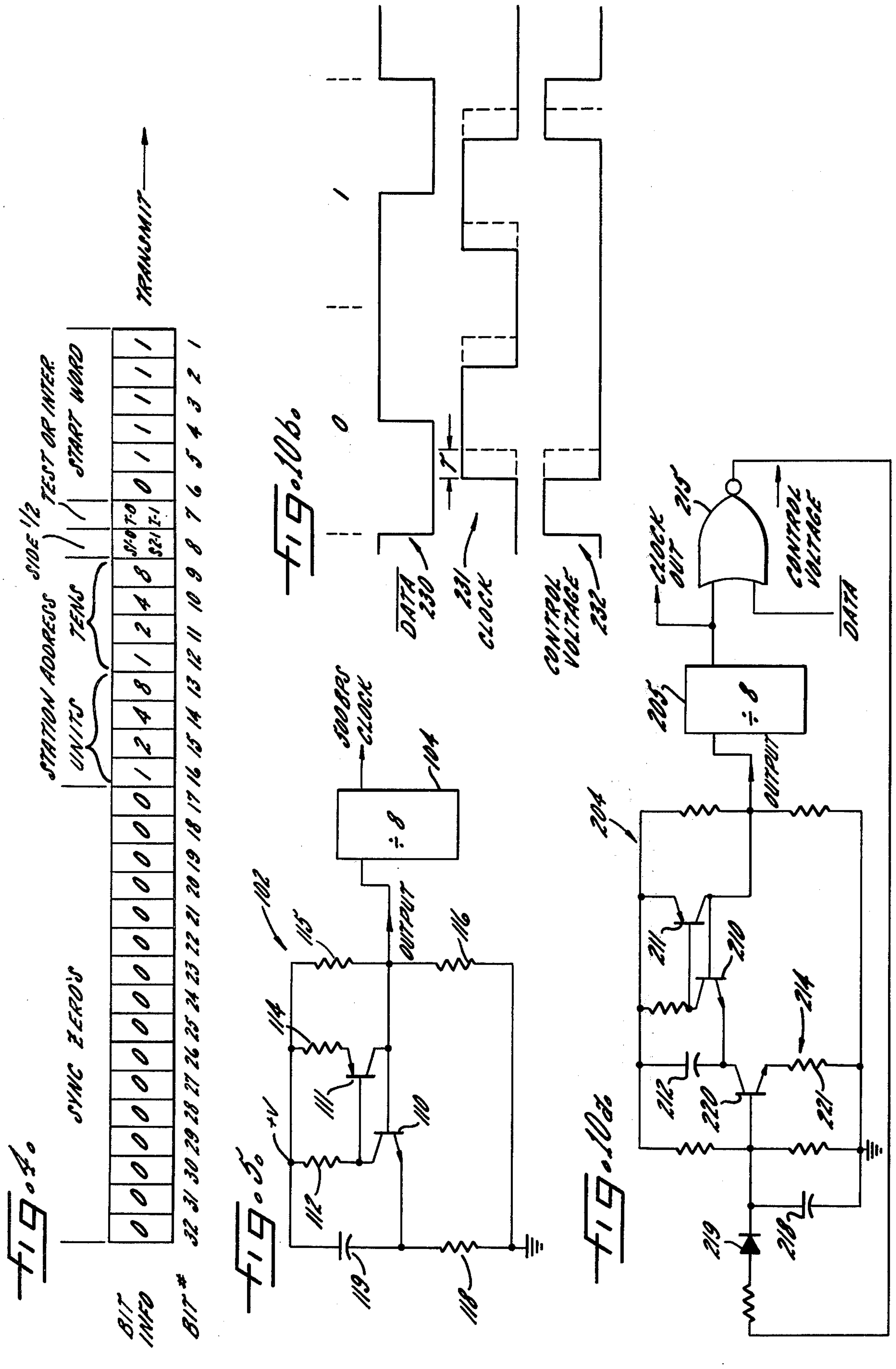
FIG. 4 is a sketch setting forth the structure of a digital address word.
FIG. 5 is a schematic diagram of a master or free running clock for use in the circuit of FIG. 3.
Figure 9:
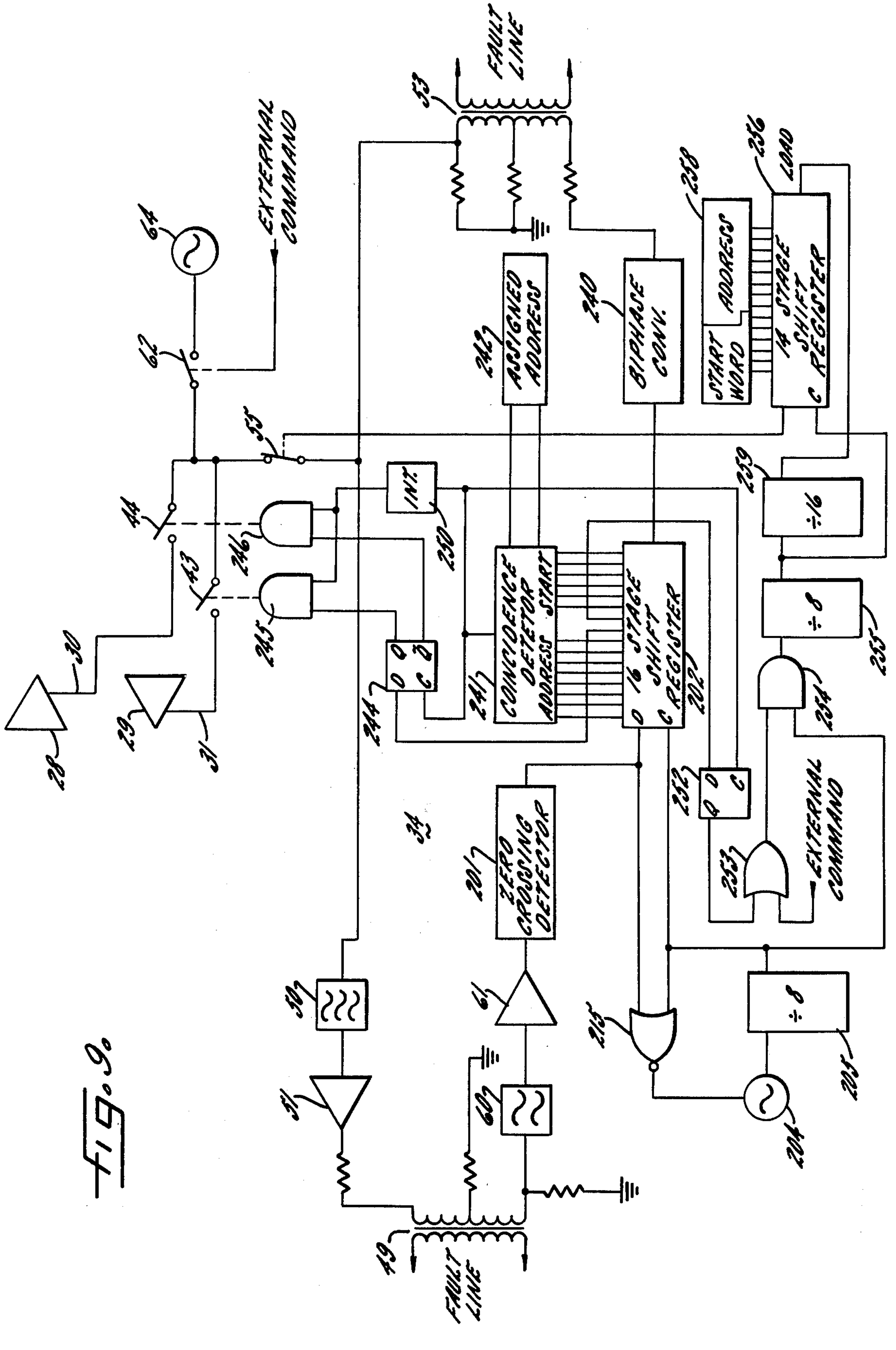

FIG. 9 is a block diagram of a fault interrogation circuit for use at each remote testing station in the interrogation system of FIG. 1;

FIG. 10a is a schematic diagram of a slave or synchronized clock for use in the fault interrogation circuit of FIG. 9;

FIG. 10*b* is a timing diagram illustrating the operation of the slave clock of FIG. 10*a;*

Figure 11:
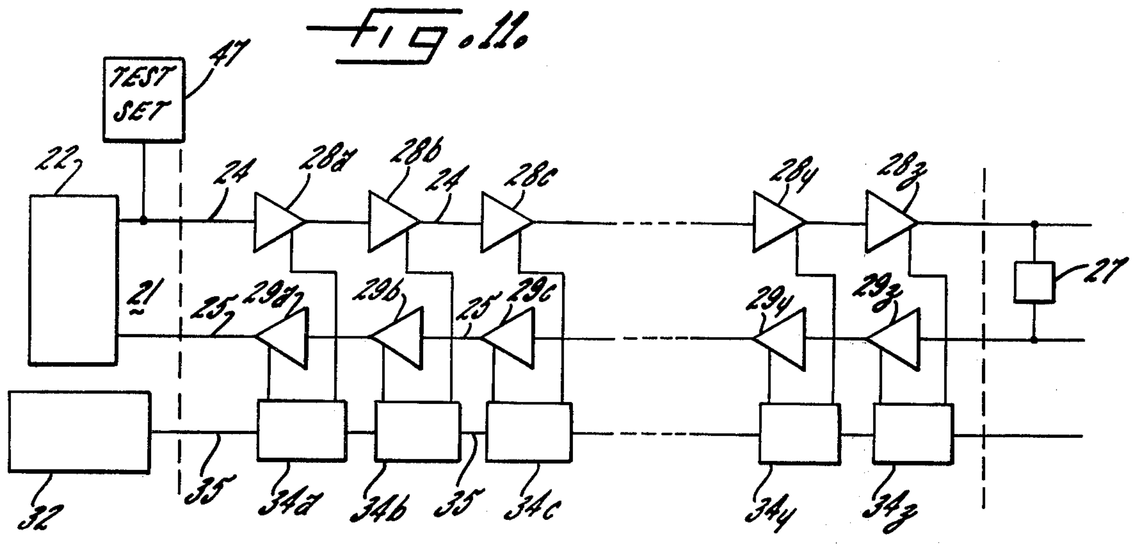
Figure 12A:
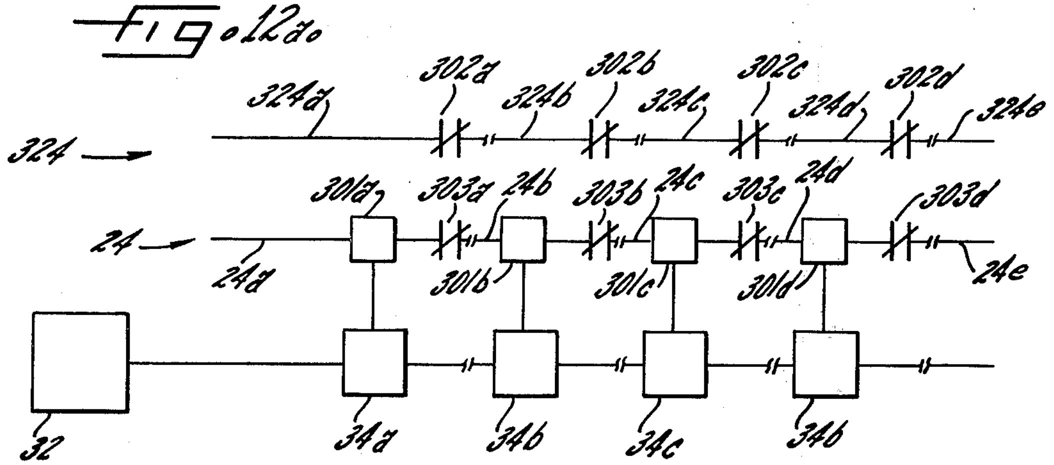
Figure 12B:
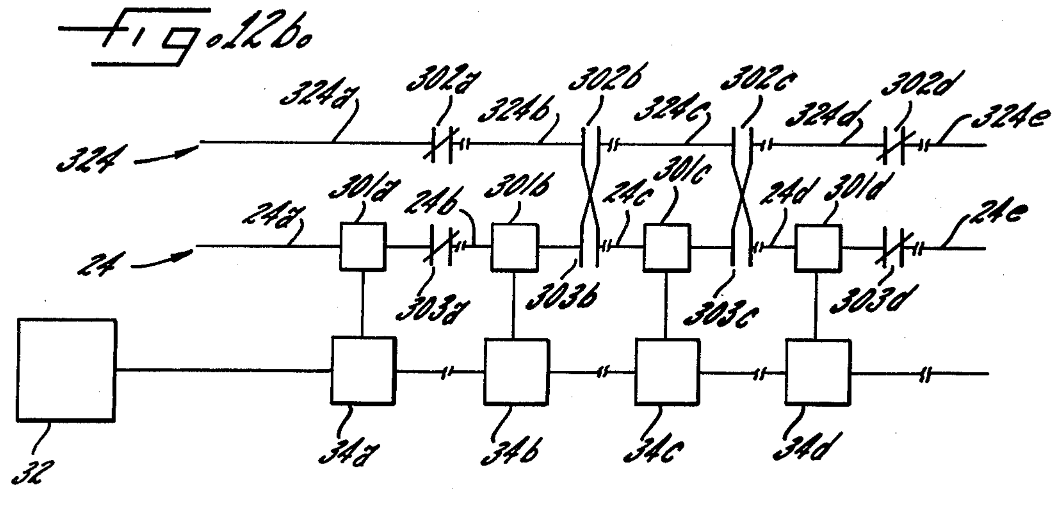

FIG. 11 is a diagram illustrating a portion of a digital transmission system incorporating a fault locating system exemplifying the present invention; and FIGS. 12*a* and 12*b* are diagrams illustrating the application of the fault locating system to a sectionalized span line.

While the invention will be described in connection with a preferred embodiment, it will be understood that there is no intent to limit it to that embodiment. On the contrary, the intent is to cover all alternatives, modifications and equivalents as may be included within the spirit and scope of the invention as defined by the appended claims.

Turning now to the drawings, and particularly to FIG. 1, there is shown a portion of a digital repeatered transmission line incorporating a remote interrogation system exemplifying the present invention. A central office 21 includes the normal operating communication equipment 22 coupled to outgoing transmit span line 24 and incoming receive span line 25. The communication equipment 22 is illustrated in block form, as the particular nature of such equipment, and an understanding of its functioning is not necessary for an understanding of the invention. Suffice it to say that such equipment generally includes multiplexers and encoders for conditioning a signal for transmission, and decoders and demultiplexers for extracting the information from received signals. Additionally, the communication equipment 22 includes a central office battery for supplying power to the span line. A plurality of repeater stations, one of which is illustrated at 26, are interposed in the span line which links the central office 21 to a distant office (not shown). More specifically, a regenerator 28 is interposed in the transmit line, and a similar regenerator 29 in the receive line, for retiming and reshaping the pulsed signals carried by the span lines. The regenerators 28 and 29 include fault windings 30 and 31 respectively for coupling the aforementioned audio responses to a fault line. It should also be noted that, in order to distribute the line power feeding requirements for relatively long lines, selected repeater locations may also be provided with battery supplies for simplex powering of a section of the line, such repeater locations being known as power feeding points.

It will be apparent to one skilled in the art that the normally encountered span line takes the form of a cable comprising a plurality of transmit and receive lines, and that each repeater station includes a regenerator for each line. However, the simplified illustration will be sufficient for an understanding of the novel fault locating system.

In accordance with the invention, a fault locating system is provided having the capability to digitally address, via the fault line, each of the repeater stations for selecting individual regenerators for testing. Accordingly, the central station is provided with a testing equipment control circuit generally indicated at 32, while each repeater station to be tested is provided with a fault interrogation circuit generally indicated at 34. Paralleling the span lines 24 and 25, is a fault line 35 serially coupling the central station and all of the repeater stations.

For providing a digital test signal having an audio test frequency component, a commercially available test set 47 is coupled to the transmit line 24 for causing each regenerator in the transmit line to produce an audio frequency test response. Accordingly, the fault winding 30 of each regenerator 28 in the span line 24 carries a signal including an audio frequency component resulting from the signal generated by the test set 47. Additionally, at a remote station, such as the aforementioned distant office, an available loopback module may be coupled between the transmit line 24 and the receive line 25. Such module includes means for detecting an abnormal number of bipolar violations in the transmit line signal, such as those included in the test signal, and in response to such detection, looping back the signal to the receive line 25. Accordingly, when used with a loopback module all of the transmit line regenerators 28 and all of the receive line regenerators 29 are caused to simultaneously respond to the test signal provided by test set 47.

As will become more apparent, the selection of an individual regenerator for test is accomplished via digital addressing techniques utilizing the fault line. As a result, the full capabilities of the test set 47 are not required, a single test frequency being sufficient. By way of example, in the illustrated embodiment the 3kHz signal is utilized for testing all the regenerators in both the transmit and receive span lines. The 3kHz signal, the highest test frequency produced by the commercially available test set, is preferred because of the desirability of maintaining a large frequency separation between the test signal and the address signal to be described below.

In a preferred embodiment, the fault line 35 is adapted for two way communication between the control circuit 32 and the serially connected fault interrogation circuits 34. More specifically, digital address codes are transmitted from the central office, and the audio or analog test responses are received at the central office. The digital address signals are produced by logic circuitry 36 and coupled through biphase converter 38 to the fault line via hybrid transformer 39. The logic circuitry 36 is adapted to produce a plurality of unique digital addresses, individual ones of which are selectable through test select module 40.

For responding to the address signals, the fault interrogation circuits 34 each include means for assigning a unique digital address thereto, shown herein as coincidence detector 41 and logic circuitry 42. This arrangement causes each fault interrogation circuit to monitor the address signal on the fault line, the respective conicidence detectors being adapted to respond to their assigned address by generating a coincidence signal. Such signal, in conjunction with a bit within the digital address indicating whether the side 1 or side 2 regenerator (transmit or receive) has been selected, closes switch 44 or 43 to couple the response of the selected regenerator 28 or 29 to the fault line. Additionally, each fault interrogation circuit is equipped with a biphase converter 45 for regenerating the digital address signal and coupling the regenerated signal to hybrid transformer 53 for retransmission to subsequent testing stations.

For returning the test response of the selected regenerator to the central station, the regenerator response passed by switch 44 or 43 is coupled through a bandpass amplifier comprised of a 3kHz bandpass filter 46 and an associated amplifier 48 to the hybrid transformer 49. As a result, the regenerator response is coupled to the fault line 35 for return to the central station 32.

At the central station, the returned signal is passed by through hybrid transformer 39 and a bandpass amplifier comprised of bandpass filter 50 and amplifier 51, through an impedance matching pad 52 to a detector 54. The detector, which is provided for evaluating or measuring the response, may be a typical meter arrangement as normally associated with the traditional test set 47.

The aforementioned hybrid transformers 39, 49 and 53, provided at each interface with the two wire fault line, assist in maintaining adequate isolation between the two signals (digital addresses and regenerator responses). Furthermore, the digital address data, which in the illustrated embodiment is transmitted at 500 bits per second, is received through a 1500 Hz low pass filter, while the 3 kHz tone is routed through a bandpass filter. This arrangement not only increases the isolation between the two sides, but also improves the signal to noise ratio for both signals.

Since a single 3 kHz tone is used to test all regenerators in the system, some caution is required to insure that the received 3 kHz tone is indeed originated at the addressed regenerator. Accordingly, means are provided for incorporating an interrogate command within the digital address signal, and for responding to the reception of the interrogate command by verifying the source of the returned signal. The test select module 40 is provided with means for setting a bit within the digital address word for causing the selected repeater station to respond in the interrogate mode. In response to the detection of its associated address in conjunction with the interrogate bit, the coincidence detector 41 is adapted to control a modulating switch 55 for modulating the returned analog signal with the digital address assigned to the testing station. More specifically, switch 55 is opened and closed at a predetermined rate, in a code corresponding to the digital address assigned to the repeater station causing the returned 3 kHz tone to be 100% amplitude modulated with the digital address of the responding station. A demodulator 56 is provided at the central station for extracting the digital code, and coupling it to logic circuitry 36. The logic circuitry 36 cooperates with a coincidence detector 58 to compare the extracted code with the transmitted code and to produce an indication that the addressed regenerator is responding. Additionally, a display 59 may be incorporated within the central office equipment for responding to the demodulated code to display the address of the responding regenerator.

As a further feature of the invention, means are provided for causing the system to become "self-interrogating" by coupling a signal simulating a test response to the fault line and modulating the coupled signal with the digital address of the repeater station originating such signal. Such an arrangement may efficiently be used to indicate the location of an equipment failure. For example, long span lines have evolved to include span switching equipment adapted to automatically insert a spare section of span line into a system in response to a failure in a corresponding span section. Such equipment may provide an external command for closing switch 62 thereby to couple the signal from a 3 kHz local oscillator 64 to the modulating switch 55. In response thereto, the modulating switch is adapted to modulate the local oscillator signal with the digital address associated with the particular repeater station. While such an arrangement may be provided at every repeater station, it is presently contemplated that provision be made only at selected stations, such as power feeding points or span switching points.

As generally indicated by the current source 65, it is seen that the novel fault line is simplex powered. Each repeater station includes a voltage regulator including Zener diodes 66 and 68 for providing power to the fault interrogation circuit. By utilizing low power integrated circuit components, the power requirements of each repeater station may be limited to 10 volts, and the simplex current limited to approximately 10 milliamps.

It should also be noted with regard to FIG. 1 that an added dimension of selection is provided in a practical system by coupling the test set 47 to the individual span line to be tested. More specifically, in the normal communication system, the fault windings of all of the transmit regenerators at a given repeater station are coupled to switch 44 and the fault winding of all the receive regenerators at that station are coupled to switch 43. Accordingly the digital address is adapted to select a particular station in the transmit or receive line, while the particular regenerator is selected by coupling test set 47 to the origin of the proper span line.

Figure 2:
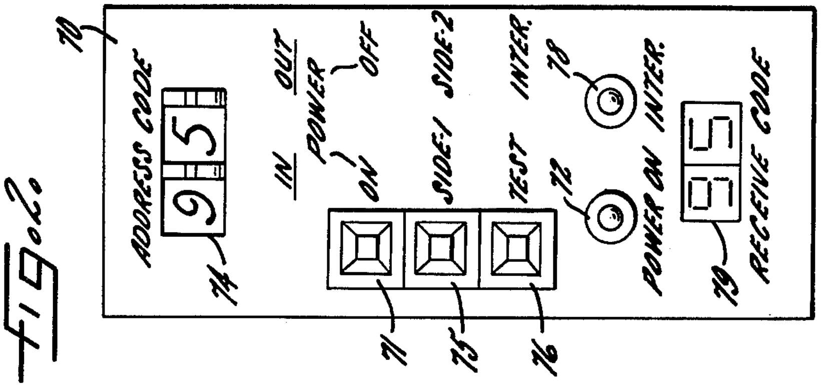
FIG. 2 is a diagram of a control panel for operating the exemplary interrogation system.

The simplicity of operation of the disclosed fault interrogation system may be appreciated with reference to FIG. 2, which illustrates a control panel 70 for operating the testing equipment at the central station 32. A two position latching pushbutton switch 71 is provided for applying power to the unit, the power on condition being indicated by LED 72. For selecting a particular repeater station for testing, a bank of thumbwheel switches 74 is provided having digital outputs coupled to the logic circuitry 36. In the illustrated embodiment, a two digit bank of thumbwheel switches is used, allowing the selection of up to 99 repeater stations. However, it will be apparent to one skilled in the art that the system may easily be expanded to, for example 999 repeaters.

For selecting a transmit or receive regenerator 28 or 29 at the selected repeater station, a latching pushbutton 75 is provided. When latched in the depressed condition, the pushbutton serves to select the side 1 or transmit regenerator 28, while in its alternate position the side 2 or receive regenerator 29 is selected. A similar pushbutton 76 is used to select the normal test mode in the depressed condition, or the interrogate mode in the raised position. Associated with pushbutton 76 is Interrogate indicator LED 78 adapted to be illuminated in the event the coincidence detector 58 determines that the received digital address corresponds to the address set on thumbwheels 74. A readout 79 may be provided, if desired, to visually indicate the detected returned address.

Figure 3:
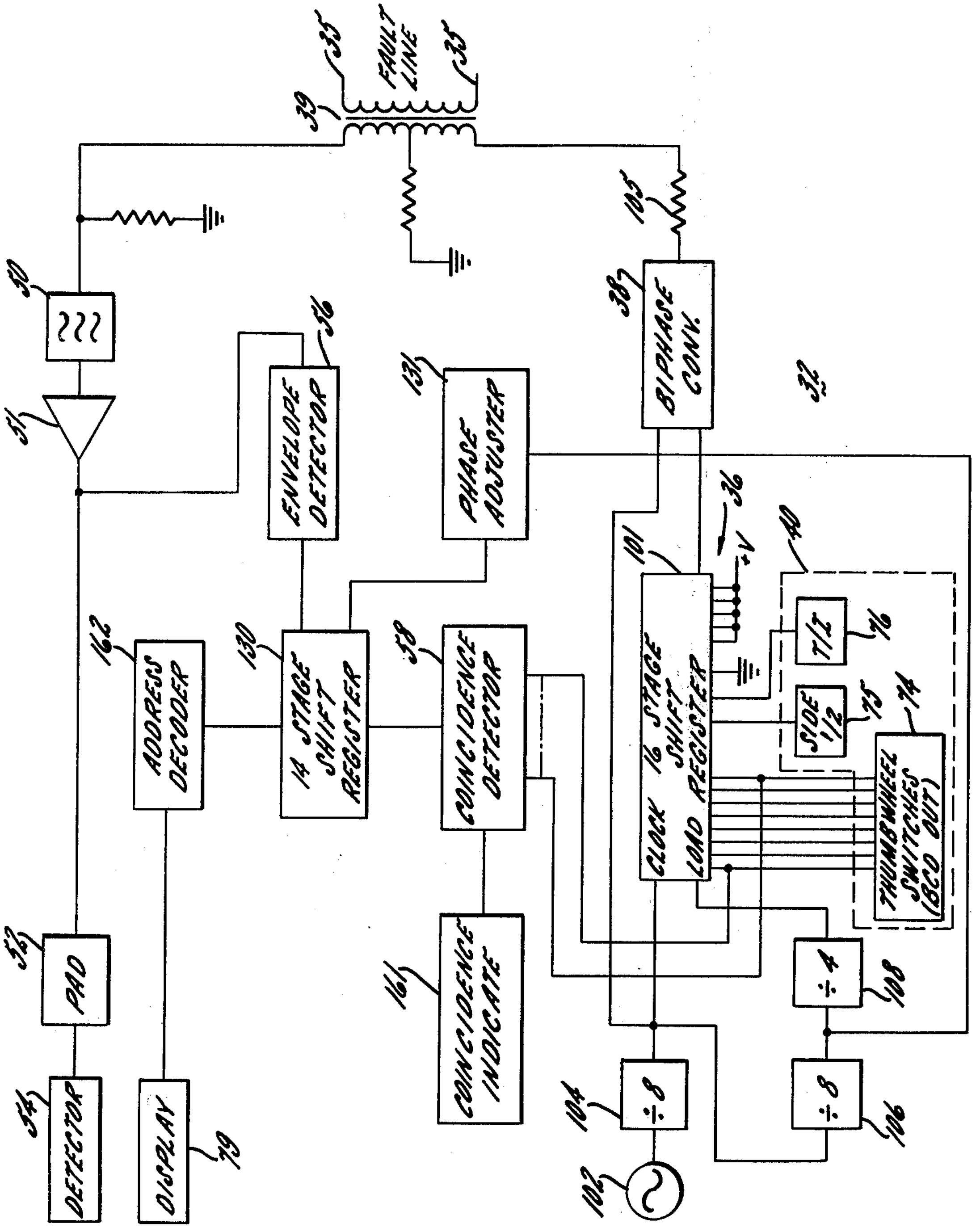
FIG. 3 is a block diagram illustrating the control circuitry located at the central testing station in the interrogation system of FIG. 1.

Turning now to FIG. 3, the detailed structure of the exemplary central office control circuit 32 will be described. For selecting a repeater station for testing, the digital outputs of the thumbwheel switches 74 are coupled to logic circuitry, shown herein as a 16 stage shift register 101. The shift register 101 is a parallel to serial converter which has 8 of its parallel inputs coupled to the associated outputs from the thumbwheel switches 74. A ninth bit of the shift register 101 is coupled to the side 1/side 2 selector 75, while a tenth bit is coupled to the test/interrogate selector 76. The eleventh bit of register 101 is coupled to ground and the twelfth through sixteenth bits are coupled to the positive voltage supply for purposes of word synchronization. As will become apparent, the 16 stage register 101 is clocked in such a way that 32 bit digital address words are serially transmitted over the fault line 35.

Referring briefly to FIG. 4, there is illustrated the structure of the digital word, including 32 bits, 16 of which must always be data 0's. As will be described below, the assurance that more than half of the bits within a word are data 0's, allows the system to be simply bit synchronized. The first 6 bits to be transmitted are designated the start word portion of the digital word. It is seen that the first 5 bits must always be data 1 followed by a 0 bit. Recognition of this signal at a repeater location indicates that the bit immediately following the 0 will be the first bit of the actual address. Five 1 bits followed by a 0 bit are well adapted, in the illustrated embodiment, to signal the start word, as the arrangement of bits makes that combination unique. More specifically, the BCD addressing techniques and the word structure preclude the possibility of producing this particular sequence except to signal a start word. The remaining bits contain the information indicated in FIG. 4. Briefly, bit 7 indicates to the addressed repeater station, whether such station should respond in the test or interrogate mode. When bit 7 is set to the 1 condition, the repeater station responds in the interrogate mode by modulating the returned signal with its digital address. However, when it is desired to evaluate the returned response, bit 7 is set to a data 0 causing the returned response to be unmodulated for effective measurement. Bit 8, in the data 0 condition causes the side 1 regenerator to respond, and in the data 1 condition causes the side 2 regenerator to respond. Bits 9–12 comprise the tens digit of the station address in BCD, while bits 13–16 similarly comprise the units digit. Bits 17–32 are constrained to be 0's, and are included, as will be made apparent, to allow the slave clock at each repeater station to be synchronized to the master clock at the central office. In a preferred embodiment, the digital words are transmitted continuously, and are decoded at each repeater station utilizing the start word bits for word detection.

Referring again to FIG. 3, it is seen that the loading and shifting of register 101 is controlled by a local oscillator 102 and its associated frequency dividers. In the illustrated embodiment, the local oscillator frequency is set at 4,000 Hz, and is divided by 8 in a frequency divider 104 to yield a 500 bit per second clock signal. Such an arrangment allows the use of a relatively low value precision capacitor in the local oscillator while still providing a relatively low frequency transmission bit rate. The bistable frequency divider 104 provides a signal to the clock input of register 101 which causes the digital address word to be serially shifted to the biphase converter 38. Additionally, the 500 bit per second clock signal is divided by 32 by frequency dividers 106 and 108, the output of frequency divider 108 being provided to the parallel load input of the shift register 101. Accordingly, after every 32nd clock pulse, the load input of the shift register 101 is activated, causing the data present on the parallel input terminals (the thumbwheel switches, etc.) to be parallel loaded into the shift register. Thus, as the 16 stage register is loaded on every 32nd clock pulse, the digital word, whose structure was set forth in FIG. 4, is serially presented to the biphase converter 38.

Turning now to FIG. 5, there is shown a clock circuit suitable for use as a master clock 102. While numerous forms of clock circuit may be utilized, the illustrated embodiment is both simple, and is easily adaptable for use as a slave clock at the repeater stations. The clock circuit includes a cross coupled pair of transistors 110 and 111 forming a circuit equivalent to a programmable unijunction transistor (PUT). A pair of serially connected resistors 115 and 116 set a program point or threshold level below which the circuit will conduct to discharge a timing capacitor 119. The timing circuit comprises a resistor 118 and capacitor 119 serially coupled across the power supply, with their common junction coupled to the emitter of transistor 110. Accordingly, the resistor 118 controls the rate at which capacitor 119 charges, the voltage at their common junction causing the circuit to conduct when it falls below the threshold voltage set at the junction of resistors 115 and 116. The brief clock pulses produced at the rate of 4 kHz are coupled to frequency divider 104 whose output forms the 500 bit per second clock signal.

Figure 6B:
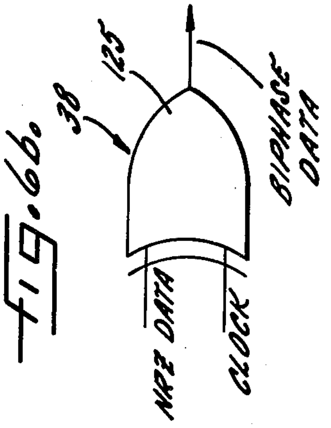
FIG. 6b is a schematic diagram showing means for implementing a biphase encoder.
Figure 6A:
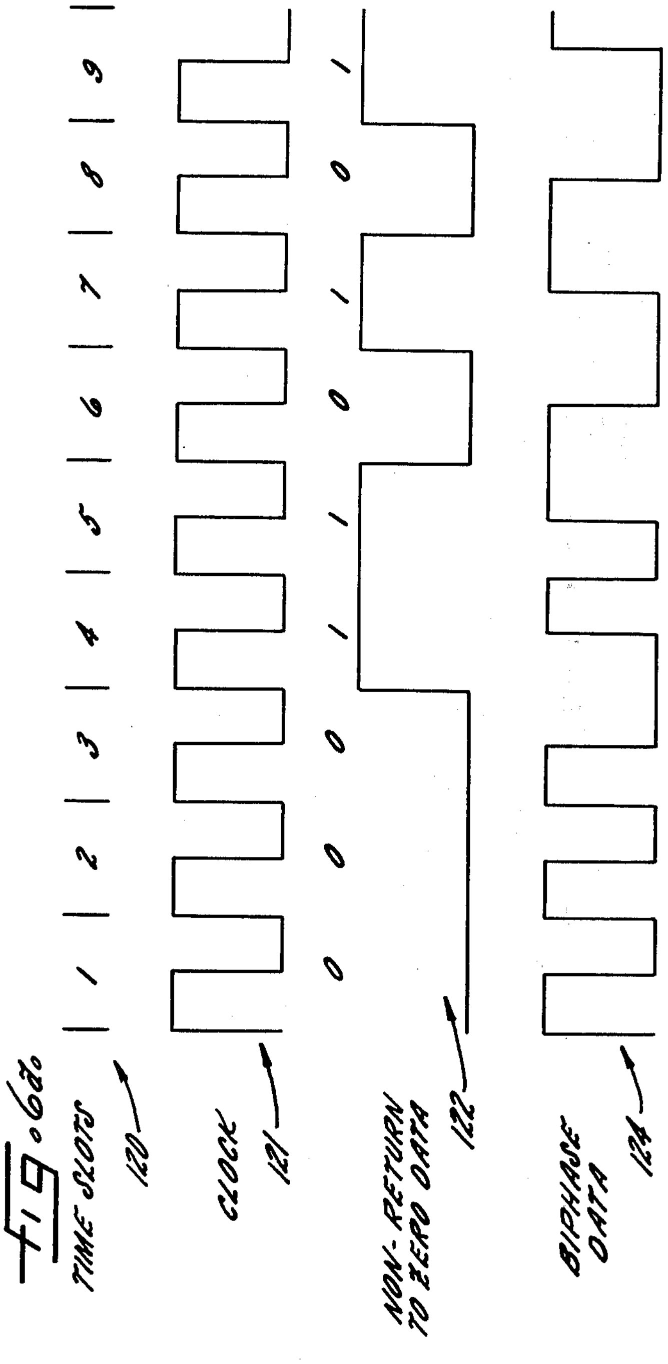
FIG. 6a is a timing diagram illustrating the biphase digital code used in a preferred embodiment of the invention.

In practicing the invention, a simplified encoding technique is utilized for serially coupling the digital address signals to the fault line. Referring to FIGS. 6*a* and 6*b*, the biphase code and means for implementation thereof, are illustrated. In FIG. 6*a*, the clock pulses 121 (at the output of frequency divider 104) establish the time slots illustrated at 120. An exemplary sequence of non-return-to-zero (NRZ) data, as is produced at the serial output of the shift register 101, is illustrated at 122. As the fault line circuit has a finite low frequency response, it is incapable of directly transmitting the NRZ data without distortion. Of the numerous aternative formats available, such as bipolar, zero disparity code, biphase, etc. the biphase format is preferred in the illustrated embodiment for its simplicity. The biphase code resulting from the illustrated clock and NRZ data is illustrated at 124. It is seen that the maximum amount of time the biphase data is allowed to dwell at either a high or low level is one time slot, providing a signal with reduced low frequency components.

Referring to the biphase data signal 124, it is seen that biphase data includes a transition at approximately the midpoint of each time slot. The biphase data 0, as illustrated in time slots 1, 2 and 3, comprises a signal which is initially high and switches to a low level at approximately the midpoint of the time slot. By way of contrast, the biphase data 1, as illustrated in time slots 4 and 5, comprises a signal which switches from a low to a high level at approximately the midpoint of the time slot.

A first advantage of the biphase embodiment of the invention is the ease of implementing the biphase converter 38. Referring to FIG. 6*b*, it is seen that the NRZ data (provided by the output of the 16 stage shift register 101) and the clock signal (provided at the output of frequency divider 104) are coupled to the respective inputs of an Exclusive OR gate 125. Quite simply, the output of the Exclusive OR gate 125 is a biphase signal resulting from the NRZ data and clock. Referring again to FIG. 6*a*, it is seen that the first time slot NRZ signal is a data 0. In the first half of such time slot, the inputs to the Exclusive OR gate 125 will be high and low respectively, causing the output thereof to be high. For the second half of the time slot, however, both inputs to the Exclusive OR will be low, causing its output to be driven low. Encoding of a data 1 takes place in a similar fashion. For example in the 4th time slot, it is seen, that for the first half of the time slot, both inputs to the Exclusive OR are at a high level, causing the output to be low. During the second half of the time slot, the inputs are at dissimilar levels, causing the output to be driven high. Thus, the Exclusive OR gate 125 provides the encoding element of biphase converter 38, the output thereof being amplified, if necessary, to provide sufficient driving capability to couple the biphase signal to hybrid transformer 39 through impedance defining resistor 105 (FIG. 3).

Referring again to FIG. 3, attention will now be directed to the signal reception portion of the central office equipment. Initially, it is seen that the signal is coupled through the hybrid transformer 39 to a bandpass amplifier comprised of bandpass filter 50 and amplifier 51. This arrangement serves to eliminate noise which may have been picked up in the fault line, as well as provide additional isolation between the transmit and receive portions of the fault line circuit. As noted above, the output of the bandpass amplifier is coupled through an impedance matching pad 52 to a detector 54. The detector may be implemented by an existing equipment capable of analyzing or measuring the returned regenerator response. Additionally, the output of the bandpass amplifier 51 is coupled to an envelope detector or demodulator 56. The envelope detector 56 is adapted to extract the address signal from the returned response in the event such response is amplitude modulated with the address code of the responding station. The detector may be implemented by various means known to the art, and is adapted to respond to the on or off condition of the returned 3 kHz signal which, it is recalled, is controlled in a digital pattern by modulating switch 55 (FIG. 1). Accordingly, the envelope detector 56 provides a serial signal to the 14 stage shift register 130 indicating the digital address of the responding station.

For synchronizing the incoming address data with the system clock, to allow accurate clocking thereof, a phase adjuster 131 is coupled between the master clock and the 14 stage shift register 130. As will be described below, the clock at each of the repeater stations is frequency locked to the master clock comprised of oscillator 102 and frequency divider 104. However, the delay of the received data is indeterminate, and therefore, it is necessary to automatically adjust the phase of the clock which drives the shift register 130. More specifically, it is desired to keep the leading edge of the clock pulse approximately in the center of the received data.

The clock pulse provided to the phase adjuster 131 is derived from the main 500 bit per second clock divided by 8 in frequency divider 106. As will become apparent, the modulating frequency is approximately 62Hz, being derived from the main clock signal via a divide by 8 frequency divider at the repeater station. Accordingly, the clock signal provided to the phase adjuster is at the same rate as the modulating frequency.

Referring now to FIGS. 7*a* and 7*b*, the structure and operation of the phase adjuster 131 will be set forth. The clock signal from frequency divider 106 is coupled through a capacitor 132 to the base of a PNP transistor 134. Additionally, current generator 135 provides a control current to the junction formed between the capacitor 132 and the base of transistor 134. The transistor 134 has its emitter coupled to a positive supply of voltage, and its collector coupled through a resistor 136 to circuit common. Accordingly, at each positive transition of the clock, a positive step appears at the base of transistor 134. In response thereto, transistor 134 ceases conducting and remains cut off for a period of time necessary to discharge capacitor 132. As such period is determined by the control current supplied by the current generator 135, it is seen that the signal at the collector of transistor 134 corresponds to the clock signal, but is delayed by a period determined by the control current. The delayed clock thereby generated is applied to the clock input of a flip-flop 137 having its data input coupled to the data signal produced by the envelope detector 56. Accordingly, the Q output of the flip-flop 137 may be considered as delayed data, corresponding to the data signal, but delayed by a period determined by the delayed clock.

The waveforms of the circuit of FIG. 7*a* are illustrated in FIG. 7*b*. The clock signal (approximately 62 Hz.) which is coupled to capacitor 132 is illustrated at 138. The resulting signal at the base of transistor 134 is illustrated at 139. It is seen that the signal at the base of transistor 134 switches from a low to a high level in response to a similar transition of the clock. Additionally, it is seen that the signal slopes back toward a low level at a rate determined by the control current supplied by current generator 135. During the time the capacitor 132 is discharging, (the period denoted by the sloped portion of the signal 139) the delayed clock signal 140, produced at the collector of transistor 134, remains at a low level. When the base signal returns to a reference level sufficient to allow transistor 134 to conduct, the collector thereof is again driven to a high level. It is seen that the positive going edge of the delayed clock signal is delayed by a period controlled by the slope of the capacitor discharge.

For supplying a control current proportional to the amount of delay between the received data and the master clock, the phase adjuster further includes means responsive to the delay period for generating a control current. As shown in FIG. 8*a*, the data and delayed data are supplied to the two inputs of an Exclusive OR gate 143. Accordingly, the output of the Exclusive OR gate is maintained at a normally low level, and produces a brief positive pulse whose width is equal to the delay between the transitions of the data and the delayed data. This pulse is inverted by inverter 141 and applied to the base of a transistor 142, causing that transistor to switch off for a period determined by the amount of delay. It is seen that a resistor 144 and capacitor 145 are serially coupled across the power supply, and have their common junction coupled to the collector of transistor 142. Additionally, the common junction is coupled to the base of a Darlington pair of transistors 146 and 148. When transistor 142 conducts, it serves to discharge capacitor 145. Similarly, when transistor 142 is cut off, capacitor 145 charges through resistor 144. Accordingly, the voltage present on capacitor 145 at the end of the charging period is proportional to the width of the pulses produced by Exclusive OR gate 143. Capacitor 149 is coupled between the emitter of Darlington transistor 148 and the negative voltage supply, for peak charging to the peak voltage of capacitor 145 less the base-emitter voltage drops across the Darlington. The voltage on capacitor 149 is supplied to one input of a differential amplifier generally indicated at 150. Accordingly, the current through the differential amplifier is a function of the width of the pulses produced by Exclusive OR gate 143. The output of the differential amplifier, indicated at 151, is coupled to the base of transistor 134 (FIG. 7*a*) for supplying the control current thereto. Accordingly, the amount of control current is directly proportional to the phase of the delayed clock relative to the incoming data. The components within the circuits of FIGS. 7*a* and 8*a* are adjusted so that the delayed clock is approximately at the center of the incoming data, and automatically maintained in the proper phase relationship thereto.

The operation of the circuit of FIG. 8*a* may be better understood by reference to FIG. 8*b*, illustrating the waveforms thereof. The data and delayed data supplied to the inputs of Exclusive OR gate 143 are illustrated at 152 and 154 respectively. Waveform 155 illustrates the pulses coupled to the base of transistor 142, which it is recalled, are produced as the result of the data and delayed data illustrated. It is seen that the width of the negative pulse 155 is directly related to the delay period. The solid line portion of waveform 156 illustrates the signal at the collector of transistor 142, which is normally maintained at a reference level, and ramps upward to a level dependent upon the width of the pulses of waveform 155. The dotted portion of waveform 156 indicates the voltage present on capacitor 149 as a result of the aforementioned signals. It is recalled that such voltage level establishes the amount of control current, and thereby the phase of the delayed data.

Referring again to FIG. 3, it is seen that the parallel outputs of the 14 stage shift register 130 are coupled to a coincidence detector 58. As will be described below, the received signal comprises 6 bits indicating the start of a word, followed by 8 bits indicating the 2digit address of the responding station. Accordingly, the coincidence detector contains circuitry responsive to the 6 bit start word signal for enabling the coincidence detector 58 to compare the 8 bits within the address indicating portion of the shift register to the 8 bits provided by the thumbwheel switches 74. In response to the detection of a coincidence, a signal is provided to the coincidence indicator 161 to illuminate the Interrogate LED 78 (FIG. 2).

Alternatively, the shift register 130 may comprise a 14 bit serial to parallel converter, as described above, operating in conjunction with an 8 bit buffered register. In such an arrangement, when the start work signal is detected in the proper 6 bits within the shift register 130, the buffered portion of the register is strobed to accept the 8 bits dedicated to the address. Accordingly, the address signal may be provided to coincidence detector 58 directly, eliminating the need for the coincidence detector to respond to the start work signal.

Finally, an address decoder 162 is provided, responsive to the address signal within the 14 stage register 130 for displaying the address of the responding repeater station. In a preferred embodiment, address decoder 162 is a BCD to 7 segment decoder for driving the two digit 7 segment display 79.

In summary, the central office fault interrogation equipment 32 has been described in the context of a digital communication system illustrated by span lines 24 and 25 and regenerators 28 and 29. According to an important aspect of the invention, means are provided for assigning a unique digital address to each of the repeater stations, for allowing each of such stations to be independently commanded to couple the test response of an addressed regenerator to the fault line.

Turning now to FIG. 9, the structure of one of the fault interrogation circuits 34 will be described. Initially, it is apparent that, much as the central office equipment, the fault interrogation circuit 34 is adapted for two-way communication, being coupled to the fault line by hybrid transformers 49 and 53. The received digital address signal imposed on hybrid transformer 49 is coupled through a low pass filter 60 and amplifier 61. However, as the hybrid transformer 49 is incapable of passing d.c., the output of amplifier 61 will swing both positively and negatively with respect to circuit common, in dependence on the biphase inut signal. As was noted above, the biphase format was incorporated in the preferred embodiment for ease of implementation. Because of the fact that the biphase signal can remain at a high or a low level for only one time slot, the output of amplifier 61 will be relatively symmetrical with respect to circuit common, allowing a simple zero crossing detector to be used as a decoder. To that end, a zero crossing detector 201 is interposed between the amplifier output and the data input of a 16 stage shift register 202.

For error free operation, the output of the zero crossing detector 201 must be clocked into the shift register 202 near the center of the pulse period. To that end, the fault interrogation circuit is provided with a local clock, including an oscillator 204 and a frequency divider 205, adapted to be phase locked to the master clock at the central station. Referring to FIG. 10*a*, which illustrates one embodiment of such clock, and comparing it to FIG. 5, it is seen that the slave clock includes a pair of transistors 210 and 211 arranged to operate as a programmable unijunction transistor. While the frequency of the master clock is set by the values of capacitor 119 and resistor 118, the slave clock includes a capacitor 212 and a variable current sink, generally indicated at 214, for setting such frequency. Accordingly, the current sink 214 of the slave clock performs an analogous function to resistor 118 of the master clock for establishing the clock frequency. The magnitude of the current passed by sink 214 may be varied in accordance with a control voltage, the circuit components being arranged so that the free running clock frequency, in the absence of a control voltage, is slightly below that of the master clock, or in the illustrated embodiment, approximately 3800 Hz.

The clock output is coupled through a frequency divider 205 to yield a 500 bit per second clock signal adapted to control the fault interrogation circuit. For locking the slave clock in synchronism with the master clock, a NOR gate 215 is provided, having one of its inputs coupled to the frequency divider 205, and its second input coupled to the output of the zero crossing detector 201 (FIG. 9). A capacitor 218, coupled between the base of a transistor 220 and circuit common, is adapted to be charged through a diode 219 by the output of NOR gate 215. Transistor 220 conducts in dependence upon the voltage present on capacitor 218, thereby determining the rate at which capacitor 212 charges. Accordingly, the voltage on capacitor 218 serves to determine the frequency and phase of the local oscillator 204.

The inverted data signal (at the output of zero crossing detector 201) and the clock signal (at the output of frequency divider 205) which are applied to the inputs of NOR gate 215 are illustrated at 230 and 231 respectively in FIG. 10*b*. The output of NOR gate 215, which is termed a control voltage is illustrated at 232. The solid lines in the figure illustrate the desired condition wherein the rising edge of the clock pulse occurs at approximately the one quarter point of each data time slot. Realizing that the first time slot corresponds to a data 0 while the second illustrated time slot corresponds to a data 1, it is seen that, for the desired condition, both data 0's and data 1's contribute equally to the control voltge. The dotted lines in FIG. 10b illustrate the condition wherein the clock output lags behind the ideal position by a period $\tau$. In that case, it is seen that the control voltage is increased by an amount equal to the delay period for every data 0, and decreased by a corresponding amount for every data 1. Accordingly, the control voltage may be determined by the following expression:

$$\Delta V = K (M - N) \tau$$

where

K = a constant of proportionality,

M = the number of data 0's, and

N = the number of data 1's. The foregoing expression makes it clear that if K is assumed large, synchronization will remain effective if and only if M is greater than N. Recalling from FIG. 4, that the number of data 0's within a data word is constrained to always be greater than the number of data 1's, it is seen that the foregoing condition is satisfied, and that the phase of all clocks within the system may be easily locked to that of the master clock.

Referring again to FIG. 9, it is seen that the combination of the zero crossing detector and phase locked clock allow the transmitted data to be serially loaded into a 16 stage shift register 202. Additionally the received data is also shifted out of the register and coupled to a biphase converter 240 for transmission to subsequent repeater stations. The biphase converter 240 may be implemented by the means illustrated in FIG. 6*b*. Accordingly, the digital address code transmitted by the central office control circuit is regenerated and retransmitted at every repeater station, thereby being coupled to each repeater station in the testing scheme.

In practicing the invention, means are provided at each repeater station for assigning a unique address to that station, and coupling the test response of the associated regenerator to the fault line in response to the receipt of the assigned address. Accordingly, a coincidence detector 241 is provided for comparing the address assigned by module 242 with that loaded into the register 202, and producing a concidence signal when those addresses coincide. In a simple form, the address assigning module 242 may be a series of jumpers or switches for coupling the outputs of register 202 to a gating network within coincidence detector 241. As illustrated, both the start word bits and the address bits are coupled to the coincidence detector, causing the circuitry to search for a coincidence when the digital word is loaded into proper locations within the shift register 202.

For controlling the switches 43 and 44 which couple the regenerator fault windings 31 and 30 respectively to the fault line, the side 1/side 2 bit of shift register 202 is coupled to the data input of a flip-flop 244. The clock input of the flip-flop 244 is driven by the output of the coincidence detector 241. Accordingly, when the fault interrogation circuit detects a coincidence, the flip-flop 244 is clocked, and the Q output thereof is driven to a high or a low leel, in dependence upon the condition of the side 1/side 2 bit. The Q and Q outputs of flip-flop 244 are coupled to respective AND gates 245 and 246. A second input of each of AND gates 245 and 246 is driven by an integrator 250 which integrates the pulses produced by the coincidence detector 241. The outputs of AND gates 245 and 246 control the switches 43 and 44 respectively for coupling the fault winding of a selected regenerator to the fault line. Assuming that it is desired to test the side 2 regenerator 31 at the repeater station illustrated in FIG. 9, a digital address corresponding to that station and having a data 1 in the side 1/side 2 location will be transmitted by the central office control circuit and clocked into register 202. The detection of a coincidence by the coincidence detector 241 will clock the flip-flop 244 causing the logic 1 on its data input to appear at its Q output. Additionally, the detection of the coincidence will activate integrator 250, thereby satisfying AND gate 245 and closing switch 43. The period of the integrator is set such that the switch 43 will remain closed as long as the central office continues transmitting the station address. When such transmission is terminated, either at the end of the test or when another station is selected, the integrator 250 will time out causing the switch 43 to return to its open condition.

It should be noted that switches 43 and 44, as well as the remaining switches in the fault interrogation circuit are illustrated as mechanical switches. While such switches may be implemented by reed relay devices, in a preferred embodiment, transistor switches are used.

When the system is operating in the test mode, the components described above interact to cause the test response of the selected regenerator to be coupled to the fault interrogation circuit through the normally closed modulating switch 55, and imposed upon the bandpass amplifier comprised of bandpass filter 50 and amplifier 51 for return to the central office. It is also seen that the bandpass amplifiers are arranged such that test responses from repeater stations spaced further from the central office are re-amplified by each repeater station encountered. Accordingly, the signal returned to the central office for evaluation is at a level sufficient to accomplish its function, even when originated from a distant regenerator.

For causing the system to operate in the interrogate mode, a flip-flop 252 is provided responsive to the test-/interrogate bit within the shift register 202. The flip-flop 252 is clocked by the coincidence detector, in a similar fashion to flip-flop 244. The Q output of the flip-flop is coupled to an OR gate 253 whose output in turn is coupled to an AND gate 254. The second input of AND gate 254 is supplied by the 500 bit per second clock signal. Accordingly, when the flip-flop 252 is set, the output of AND gate 254 corresponds to the 500 bit per second clock signal. Such clock signal is divided by 8 in frequency divider 255 and coupled to the clock input of a 14 stage shift register 256. The parallel inputs of shift register 256 are connected, as illustrated at 258, to load the 6 start word bits as well as the 8 assigned address bits into the shift register 256 when such register is strobed. A frequency divider 259 is provided to strobe the register after every 16th clock pulse. Accordingly, the register is loaded with the 14 bits of data and clocked out at a frequency of about 62 Hz. The shift register is reloaded after every 16 bits, causing the retransmission of the start word and address bits. The output of the shift register 256 is coupled to a modulating switch 55 for opening and closing such switch. Accordingly, the switch is opened and closed in accordance with the data loaded into the parallel to serial shift register 256. It will be apparent, therefore, that the returned rergenerator response coupled to the fault interrogation circuit is 100% amplitude modulated with the code word or address assigned to the particular repeater station.

According to another aspect to the invention, a local oscillator 64 may be provided at selected repeater stations for signalling a fault at such station. Accordingly, a switch 62 is provided, and adapted to be closed in response to an external command, for coupling the output of the oscillator 64 to the fault interrogation circuit. Additionally, the external command is coupled to OR gate 253 for activating the address transmitting portion of the circuit, thereby to modulate the simulated test response provided by oscillator 64. Thus, in response to the detection of a local failure, the fault interrogation circuit is adapted to provide a simulated test response and modulate that response with the address of the reporting station, thereby to indicate the location of the fault.

The fault interrogation circuit described above has sufficient flexibility for use in various operating modes for testing or maintaining transmission lines. In a typical application, as illustrated in FIG. 11, the test set 47 is coupled to the transmit line causing each transmit regenerator 28*a* to 28*z* to produce a test response. Additionally, a loopback module 27 is bridged between the transmit line 24 and the receive line 25 at a remote location, such as the distant central office, so that each of the receive regenerators 29*a* to 29*z*also responds to the test signal. The central office testing equipment 32 is coupled to the fault line 35 in which the fault interrogation circuits 24*a*-34*z* are serially coupled.

If it were desired to individually test each regenerator in the illustrated system an operator at the central office would set the thumbwheel switches on the control panel to select repeater station *a* (which may for example be assigned the address 0l), and would select the side 1 regenerator 28*a* by depressing pushbutton 75. The fault interrogation circuit 34*a* would respond by coupling the test response of regenerator 28*a* to the fault line for return to the central office. After evaluating the test response, the operator would operate the test/interrogate pushbutton 76. In response thereto, the fault interrogation circuit 34*a* would modulate the returned response with the station address (e.g. 01), causing the illumination of the coincidence indicator 78. If the regenerator tested favorably, the operator would continue testing of the side 1 regenerators in sequence, finishing with regenerator 28*z*. The operator would then operate the side 1/side 2 pushbutton 75 to select the side 2 regenerators and test such regenerators beginning with distant regenerator 29*z* and finishing with regenerator 29*a*.

An alternative operating mode, adapted to decrease the amount of time expended at the central office, contemplates digitally addressing only selected repeater stations, such as the power feeding points, and directly testing only the regenerators at those stations from the central office. If an addressed regenerator tests favorably, it indicates that the entire span section preceding that regenerator is operable. However, if the test of a selected regenerator produces a fault response, such response indicates the span section between the last properly tested station and the presently tested station is faulty. If desired, such section may then be tested regenerator by regenerator utilizing the techniques described in the preceding paragraph. However, in certain situations, it may prove desirable, having located the faulty section, to test such section from the power feeding point utilizing traditional techniques. It will be apparent that, because of the flexibility built into the instant fault interrogation system, such operation is entirely possible.

A further mode of system operation, the self-interrogating mode, will be described in connection with a transmission line including span switches arranged to sectionalize the line. It will be apparent, however, that the self-interrogating mode is similarly adaptable to a non-sectionalized line. Referring to FIG. 12*a*, there is shown a portion of a single transmit line 24 comprised of sections 24*a*-24*e*, joined by span switches 303*a*-303*d*. Each span section includes a series of regenerators (not illustrated). In order to further simplify the illustration, the receive line 25 is not shown. A spare span transmit line 324, also including series coupled regenerators (not shown), parallels the line 24 and is similarly sectionalized by span switches 302*a*-302*d*. As noted above, the span switches are positioned at spaced locations in the line, generally at power feeding points. Bridging the line 24 at the span switching points are error detectors 301*a*-301*d*. Such error detectors are adapted to produce a fault signal in response to the detection of bipolar violations exceeding a threshold density.

FIG. 12*a* illustrates the normal condition wherein transmit line 24 is functioning properly, the span switches 303*a*-303*d* each being in their normal position to form a continuous transmit line. In the illustrated condition span switches 302*a*-302*d* are each in their normal position forming a continuous spare span line 324 which remains unused. Monitors 301*a*-301*d* continually monitor the line signal to detect any faults which might arise. Assuming that monitor 301*c* detects a fault while monitor 301*b* does not, it will be apparent that a fault has arisen in section 24*c*. Accordingly, the error detector 301*c* provides a signal to the span switching equipment to operate span switches 302*b*, 303*b*, 302*c* and 303*c*. Such operation of the span switches sets up the condition illustrated in FIG. 12*b* wherein span section 324*c* is inserted into the line 24 so that signal transmission may continue. The faulty section 24*c* is also switched into the spare span line 324. In addition to operating the span switching equipment, the error detector couples a signal to a fault interrogation circuit 34*c*. It is recalled that the application of an external fault indicating signal serves to close switch 62 to couple the output of a 3 kHz oscillator to the modulating switch, and to activate the modulating switch 55 for transmitting the assigned address of the station. Accordingly fault interrogation circuit 34*c* imposes a simulated test signal response on the fault line modulated with the address of station 34*c* (e.g. station 37). This modulated signal is received and decoded by the central office testing equipment 32 which displays the address of the sending station. Thus appraised of the occurrence of a fault and its approximate location, an operator may be dispatched to span switching point *b* to interrogate the regenerators in section 24*c* using traditional techniques. Alternatively, if each regenerator in span 24*c* is provided with a fault interrogation circuit (not illustrated in FIG. 11*b*), and realizing that the span switches have coupled faulty span 24*c* into the spare span line 324, the operator may utilize the techniques taught herein to digitally address each regenerator in span 24*c* for testing from the central station.

While the system has been described and illustrated in connection with a preferred embodiment, numerous structural modifications as well as alternate operating modes will be apparent to one skilled in the art. For example, the 500 bit per second address transmitting frequency and the 3 kHz test signal may be modified without departing from the invention. Additionally, the system has been described in connection with biphase data transmission realizing that various other data transmission codes may be utilized.

As a further alternative, the fault line circuit may be modified for half-duplex transmission by the inclusion of latching circuitry within each fault interrogation circuit. More specifically, the full-duplex simultaneous two way communication on the fault line generally described above may be dispensed with by providing latching circuitry, such as a pair of flip-flops responsive to the coincidence detector 241, for controlling switches 43 and 44. In such a system, an address signal is transmitted to a selected station causing the fault interrogation circuit at that station to latch switch 43 or 44 in the closed position. A test signal is then applied to the span line and the regenerator response returned to the central office. After completion of the test an address signal would again be sent to the selected station for causing the closed switch to be unlatched.

Finally, the system has been described in connection with a two digit addressing capability for the sake of simplicity. However, it will be apparent that the system may be expanded to include a greater capability, such as three digit addressing, by considering the following factors. An additional switch must be added to the thumbwheel bank 74, and at least four additional stages incorporated in shift register 101 at the central office testing equipment. Additionally, in order to insure that the number of data 0's within an address word is greater than the number of data 1's, it is necessary to increase the size of the address word (illustrated in FIG. 4). This may be conveniently accomplished by interposing a divide by two frequency divider between frequency divider 108 and the load input of register 101, thereby yielding a 64 bit address word. Finally, at least four additional stages must be added to the register 130 at the central office and the registers 202 and 256 at each fault interrogation circuit. The remaining modifications (e.g. to the coincidence detectors, etc.) will be apparent to one skilled in the art and will not be further described herein.

We claim as our invention:

1. In a digital communications system having a transmission line with a plurality of digital regenerators interposed therein at spaced locations, the combination comprising, a plurality of fault interrogation circuits each having associated therewith a unique digital address, individual ones of the interrogation circuits disposed at associated regenerator locations thereby defining a plurality of testing stations, a fault line serially coupling the interrogation circuits, each interrogation circuit including (1) means for selectively couplng an analog signal to the fault line, and (2) means for modulating the analog signal with the digital address associated therewith, a control circuit coupled to the fault line and including (a) means for receiving the analog signal from the fault line, (b) demodulating means for extracting the digital address from the modulated analog signal, and (c) means for indicating said extracted digital address, whereby the testing stations may individually signal the control circuit with a signal including the address of the signalling testing station.

2. The digital communications system as set forth in claim 1 wherein one or more of the testing stations each include an oscillator for producing the analog signal, the coupling means comprising switch means responsive to an external fault indicating signal for coupling the oscillator output to the fault line, the modulating means being interposed in the path of the analog signal for indicating the location of the source of the fault indicating signal, the control circuit indicating means including a display for displaying the address of the signalling testing station.

3. The digital communications system as set forth in claim 2 wherein the number of regenerators in the transmission line is greater than the number of testing stations whereby the display of the address of a signalling testing station serves to indicate a faulty section of said transmission line, said section including a plurality of regenerators.

4. The communications system as set forth in claim 1 further including a test signal source for producing a digital test signal having a test frequency component, means for coupling the test signal source to the transmission line to cause the regenerators to respond thereto thereby to produce said analog signal, the control circuit further including (1) address signal producing means, (2) selection means coupled to the address signal producing means for including a selected one of said digital addresses in said address signal, and (3) means for coupling said address signal to the fault line, each fault interrogation circuit including (1) means coupled to the fault line for receiving said address signal, (2) coincidence detecting means responsive to the received signal for operating said coupling means, (3) the coupling means comprising switch means interposed between the regenerator and the fault line for coupling said analog signal to the fault line, the coincidence detectors of the respective fault interrogation circuits each being responsive to the address associated therewith, whereby the control circuit is adapted to select individual ones of the regenerators for evaluating the test signal response thereof.

5. In a digital communications system having a transmission line with a plurality of digital regenerators interposed therein at spaced locations, the combination comprising, a test signal source for producing a digital test signal having a test frequency component, means for coupling the test signal source to the transmission line so that each of said regenerators produces an analog response to the test frequency component of the test signal, a fault line extending along the transmission line, means for producing a plurality of multi-bit address signals corresponding to the respective regenerators, means for selecting one of said address signals and coupling said selected address signal to the fault line, a plurality of fault interrogation circuits with one of said circuits being interposed in the fault line at each regenerator location, the respective fault interrogation circuits including address recognition means responsive to respective ones of said address signals for coupling the analog test signal response of the associated regenerator to the fault line, whereby each regenerator in the communications system may be individually selected and tested via the fault line.

6. A fault locating system for use with a digital transmission line, said line coupling a first and second station and having a plurality of regenerators interposed therein at spaced locations, said system comprising in combination, a test signal source at the first station for producing a digital test signal having a test frequency component, means for coupling the test signal source to the transmission line so that each of said regenerators produces an analog response to the test frequency component of the test signal, a plurality of fault interrogation circuits, individual ones of the fault interrogation circuits disposed at associated regenerator locations, each fault interrogation circuit having a unique multi-bit digital address associated therewith, a fault line serially coupling all of said fault interrogation circuits to the first station, a control circuit at the first station coupled to the fault line, the control circuit including (1) means for selecting one of the unique digital addresses, (2) means responsive to said selecting means for producing a multi-bit digital signal containing said selected address, and (3) means for coupling said digital signal to the fault line for transmission to the fault interrogation circuits, each of said fault interrogation circuits including means responsive to the receipt of the digital address associated therewith for coupling the analog response of the associated regenerator to the fault line for return to the first station, and means at the first station coupled to the fault line for evaluating the returned analog response, whereby the number of regenerators which may be individually tested from the first station may be as great as the number of unique digital addresses.

7. The fault locating system as set forth in claim 6 wherein the transmission line includes a transmit line and a receive line, the regenerator locations each having a transmit regenerator serially coupled in the transmit line and a receive regenerator serially coupled in the receive line, the selecting means further including means for selecting the transmit or receive lines for testing, the producing means further including means for producing in the digital signal a coded indication of the selected line, the fault interrogation circuits including means responsive to the digital signal for selectively coupling the test signal response of the transmit or receive regenerator to the fault line.

8. The fault locating system as set forth in claim 7 wherein the means for coupling the test signal source to the transmission line includes a loop back circuit at the second station for coupling the test signal from the transmit line to the receive line.

9. The fault locating system as set forth in claim 7 wherein each fault interrogation circuit includes means for regenerating the digital signal for re-transmission to the succeeding fault interrogation circuits so as to maintain the intelligence content of the digital signal throughout the fault line.

10. The fault locating system as set forth in claim 7 wherein each fault interrogation circuit further includes means for amplifying the analog response for coupling to the fault line.

11. The fault locating system as set forth in claim 10 wherein the amplifying means are serially arranged to reamplify analog responses initiated at more distant fault interrogation circuits in the fault line.

12. The fault locating system as set forth in claim 6 further including means for identifying the address of the fault interrogation circuit responding to the digital signal being coupled to the fault line.

13. The fault locating system as set forth in claim 12 further including means at one or more regenerator locations responsive to a communication line failure at said location for producing a locating signal and for coupling said locating signal to the fault line, said identifying means being adapted to respond to the locating signal for indicating the location of the communication line failure.

14. The fault locating system as set forth in claim 6 wherein each fault interrogation circit includes means for producing an identifying digital signal containing the digital address associated with that particular fault interrogation circuit, and means for modulating the analog regenerator response coupled to the fault line with the identifying digital signal, the control circuit further including means for demodulating the modulated analog response for recovering the digital address, and means for comparing the recovered digital address with the selected digital address.

15. The fault locating system as set forth in claim 14 wherein one or more regenerator locations include means responsive to an external fault indicating signal at said regenerator location for producing an analog signal simulating a regenerator response, and means for activating the modulating means for modulating the produced signal with the associated digital address and for coupling the modulated signal to the fault line, the demodulating means at the control circuit serving to extract the digital address from the modulated signal, and means responsive to the demodulating means for displaying said address, whereby the fault locating system serves to report the location of remote equipment faults.

16. A fault locating system for use with a digital transmission line, said transmission line having a plurality of regenerators interposed therein at spaced locations, said system comprising in combination, means for causing the regenerators to produce an analog test response, a control circuit, a plurality of fault interrogation circuits each having a unique digital address assigned thereto, one of the fault interrogation circuits disposed at each regenerator location to be tested, a fault line serially coupling all of the interrogation circuits and the control circuit, the control circuit comprising:

first register means for forming digital address words,
clock means for shifting said register means thereby to produce a serial digital address signal,
selector means coupled to the first register means for including a selected one of the digital addresses within said address word,
means for coupling said address signal to the fault line for transmission to each of the fault interrogation circuits,
means for receiving an analog signal from the fault line,
a demodulator responsive to the received analog signal,
second register means having an input coupled to the demodulator, and
indicating means responsive to the second register means; each of the fault interrogation circuits including:
means for receiving the digital address signal from the fault line,
third register means for temporarily storing the address signal,
coincidence detecting means responsive to the third register means and to the assigned address for producing a coincidence signal in the event the signal within said register corresponds to the assigned address,
switch means responsive to the coincidence signal for coupling the analog test response of the associated regenerator to the fault line.
and selectively operable modulating means for modulating the analog response with the digital address assigned to the fault interrogation circuit;

whereby each regenerator is individually selectable for testing and for reporting its assigned address.

17. The fault locating system as set forth in claim 16 wherein each fault interrogation circuit further includes amplifier means interposed between said switch means and said fault line for amplifying said response signal.

18. The fault locating system as set forth in claim 16 further including means for transmitting the digital address signal in a biphase code, and means for assuring that the number of data 0's within said address signal is always greater than the number of data 1's, whereby each of the fault interrogation circuits may be simply synchronized with the control circuit.

19. The fault locating system as set forth in claim 16 wherein each fault interrogation circuit further includes clock means for shifting the third register means, and means for locking said clock means in phase with the clock means at the control circuit.

20. A method of locating a fault in a digital transmission line, said line having a plurality of regenerators interposed therein at spaced locations, said line having a plurality of testing stations with individual ones of the testing stations being associated with predetermined ones of the regenerators, said method comprising the steps of assigning a digital address to each of said testing stations, providing a fault line serially coupling all of said testing stations to a central station, producing a fault indicating signal at a testing station indicating the detection of a fault at such station, coupling an analog signal to the fault line in response to the fault indicating signal, modulating the analog signal with the digital address of the testing station at which the fault was detected, receiving the modulated analog signal at the central station, demodulating the analog signal to extract the address contained therein, and displaying the address of the station at which the fault was detected.

21. A method of interrogating a digital transmission line, said line having a plurality of regenerators interposed therein at spaced stations, said method comprising the steps of assigning a multi-bit digital address to each of said stations, coupling a test signal containing a test frequency component to the transmission line so that each regenerator produces an analog response thereto, providing a fault line coupling all of said stations, imposing a digital signal including the multi-bit digital address associated with a selected one of the stations on the fault line, receiving the digital address from the fault line at each station, detecting a coincidence of the digital signal and the digital address at the selected station, coupling the analog response of the selected regenerator to the fault line in response to the coincidence, and receiving the analog response from the fault line for evaluation thereof.

22. The method as set forth in claim 21 further including the step of modulating the analog response with the digital address of the selected station, demodulating the modulated response at the central station, and indicating the digital address of the selected station.

* * * * *